United States Patent [19]

Siorek

[11] 4,079,963
[45] Mar. 21, 1978

[54] VEHICLE SUSPENSION HEIGHT CONTROL

[75] Inventor: Richard W. Siorek, Warren, Mich.

[73] Assignee: The United States of America as represented by the Secretary of the Army, Washington, D.C.

[21] Appl. No.: 720,715

[22] Filed: Sep. 7, 1976

[51] Int. Cl.² .................................................. B60G 11/26
[52] U.S. Cl. ................................. 280/705; 267/65 R
[58] Field of Search ............... 280/705, 702, 708, 714; 267/64, 65 R, 15 A

[56] References Cited

U.S. PATENT DOCUMENTS

| 3,374,005 | 3/1968 | Donlon | 280/705 |
|---|---|---|---|
| 3,395,931 | 8/1968 | Piret | 280/705 |
| 3,459,439 | 8/1969 | Sinclair | 280/705 |

Primary Examiner—Philip Goodman
Attorney, Agent, or Firm—Peter A. Taucher; John E. McRae; Nathan Edelberg

[57] ABSTRACT

A vehicle suspension height control unit comprising a hydraulic pump operated by reciprocatory action of the suspension dashpot to pressurize an accumulator. Tendency of the sprung mass to go above or below its normal height range actuates a directional valve for either venting liquid from the dashpot to a sump or passing pressurized liquid from the accumulator to the dashpot. Preferably each roadwheel is equipped with one of these hydraulic units, thereby avoiding the complexity of a central hydraulic system and myriad hydraulic lines.

9 Claims, 4 Drawing Figures

VEHICLE SUSPENSION HEIGHT CONTROL

The invention described herein may be manufactured, used, and licensed by or for the Government for governmental purposes without payment to me of any royalty thereon.

BACKGROUND AND SUMMARY OF THE INVENTION

In hydro-pneumatic vehicle suspensions the vehicle sprung mass can go above or below its normal static height range due to such circumstances as the loading or unloading of cargo, thermal expansion or contraction of the hydraulic fluid, or leakage of the hydraulic fluid. The present invention provides an auxiliary hydraulic system for passing hydraulic fluid into or out of the suspension actuator to control the vehicle height irrespective of such disturbing forces.

The auxiliary system includes a hydraulic pump, operated by normal suspension movement of the actuator, to pressurize an auxiliary accumulator. The auxiliary system also includes a directional valve for either venting liquid from the actuator (when the sprung mass is too high) or admitting pressurized accumulator liquid to the actuator (when the sprung mass is too low).

The system is particularly applicable to high speed tracked military vehicles having large numbers of closely spaced road wheels independently movable over rough terrain with minimal transmission of terrain roughness to the hull. Preferably a separate complete hydraulic system is provided for each roadwheel.

THE DRAWINGS

Figure 1:
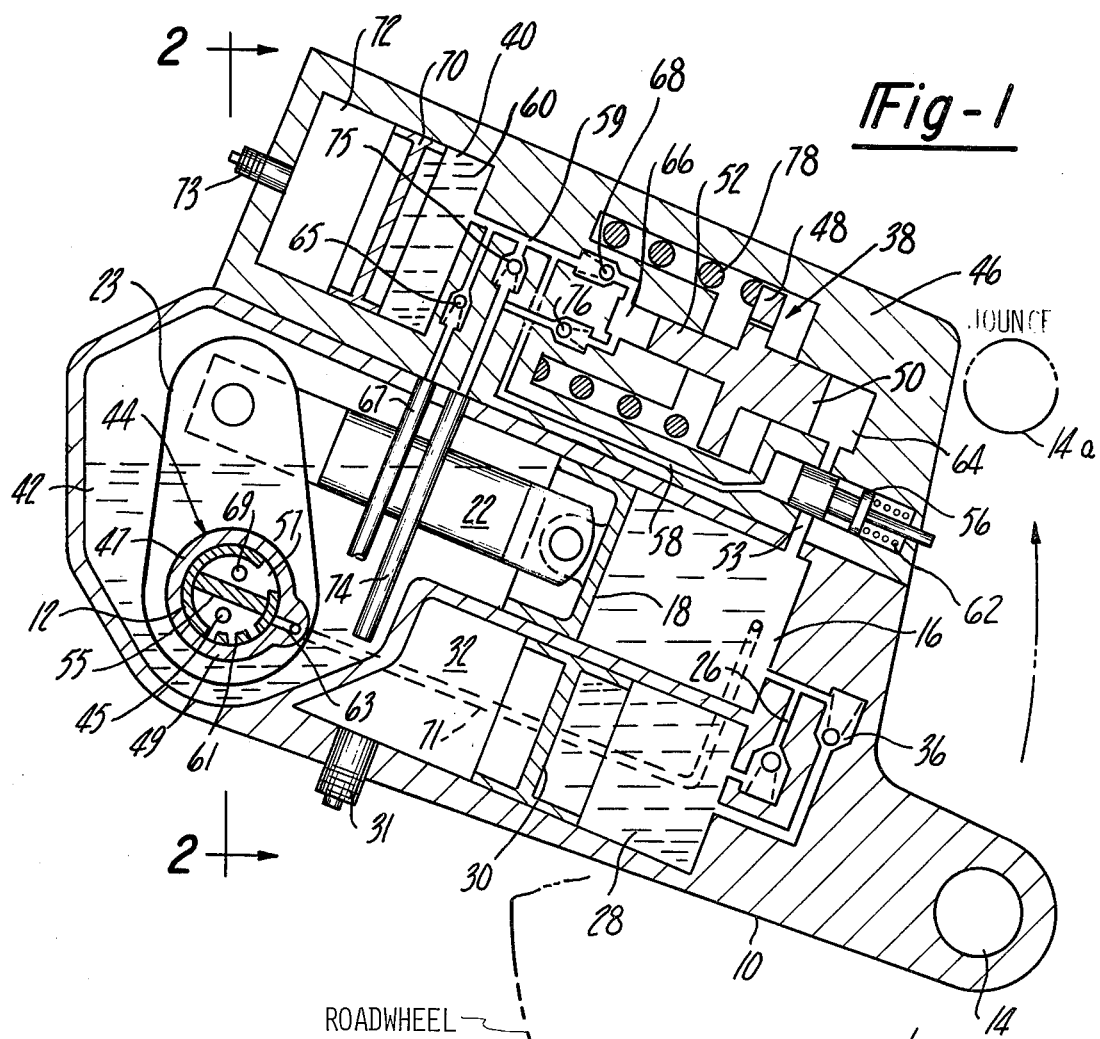
FIG. 1 illustrates a road arm equipped with a suspension unit according to this invention. Certain components, e.g. the auxiliary pump are shown oversize for illustration purposes.

The illustrated suspension is to a large extent conventional and similar in a general sense to that shown in U.S. Pat. No. 3,374,005 isued to R. H. Donlon et al on Mar. 19, 1968, and others. As shown herein, the suspension comprises a road arm 10 swingably connected to the hull 8 (sprung mass) for pivotal motion around stub shaft 12 which is suitably attached to the hull by means of mounting bolts 11. The trailing end of the road arm carries an axle 14 for the road wheel (not shown). Suspension force is provided by a dashpot cylinder 16, piston 18, piston rod 22, and upstanding crank arm 23 operatively trained between the road arm and hull. Arm 23 is located within movable road arm 10 but is affixed to the hull-mounted shaft 12; arm 23 therefore is an extension of the hull.

The road arm is illustrated in its normal static, at-rest, position. During normal movement of the vehicle over smooth or rough terrain the road arm swings up and down around its pivotal connection 12 with the hull, thereby causing axle 14 to alternately move upwardly toward the full jounce position 14a or downwardly toward the full rebound position 14b. As axle 14 moves upwardly toward the full jounce position the piston 18 penetrates further into the cylinder 16 to pump hydraulic fluid (oil) from dashpot actuator cylinder 16 through restricted one-way passage 26 into an accumulator chamber 28. Chamber 28 is defined partly by a floating piston 30 that also constitutes one wall of a pneumatic chamber 32. Chamber 32 is initially pressurized from a compressed inert gas source (not shown) via a check valve 31 in conventional fashion to provide the suspension force. The hydraulic liquid in chambers 16 and 28 provides a dashpot action for controlling the rate of movement of piston 18 under the two opposing forces, namely the pneumatic pressure and the vehicle load.

As piston 18 penetrates into cylinder 16 the floating piston 30 is moved to further compress the gas in chamber 32, thereby increasing the suspension force for subsequently moving the piston 18 outwardly toward the full rebound position 14b. Hydraulic flow during the rebound movement is provided by a second one-way passage 36.

The assembly thus far described is conventional. The present invention involves the addition of an auxiliary isolated height-maintaining mechanism comprised of a hydraulic pump 38, accumulator 40, hydraulic sump 42 and directional valve 44. Valve 44 is comprised of two concentric sleeves, one carried by stub shaft 12 and the other carried by road arm 10. Ports are provided in these sleeves to provide communication between cylinder 16, pump 38 and sump 42.

As shown in the drawing, pump 38 comprises a housing 46 accommodating a slidable piston 48 having a relatively large diameter actuator section 50 and a relatively small diameter pumping section 52. In its illustrated condition pump actuator section 50 is isolated from high pressure port 53 by a spool valve 56. The pump piston 48 therefore remains motionless. Valve 56 is biased to its illustrated closed position by hydraulic pressure in duct 58 that communicates with duct 59 and an accumulator chamber 60; when chamber 60 is pressurized the isolation valve 56 is automatically closed. When chamber 60 is relatively depressurized the reduced pressure in duct 58 allows a compression spring 62 to move valve 56 to an open position wherein pump actuator chamber 64 communicates with port 53.

Chamber 60 is partly defined by a floating piston 70 that forms one wall of a pneumatic chamber 72; a conventional charging valve 73 initially pressurizes chamber 72 to the desired system pressure. Operation of pump 38 displaces liquid into chamber 60, thereby moving piston 70 to the left and thus increasing the pressure until said pressure is sufficient to close valve 56.

When valve 56 is in an open condition the normal reciprocatory motion of the suspension (i.e. movement of cylinder 16 on piston 18) produces pressure pulses in chamber 64. These pressure pulses are applied to the right face of piston actuator section 50. The pump piston section 52 thereby moves to the left to pump liquid from pumping chamber 66 across an outlet check valve 68 to accumulator chamber 60.

Pumping chamber 66 is supplied with hydraulic liquid from the aforementioned sump 42 via a dip tube 74 and one-way inlet check valve 76.

Reciprocation of piston 48 is produced by the aforementioned pressure pulses in chamber 64 and the opposing force of a return spring 78. Thus, during operation of the suspension in the jounce direction the dashpot pressure in cylinder 16 produces a pressure pulse in chamber 64 that drives piston 48 to the left; during the rebound motion of the suspension the pressure in cylinder 16 is reduced below normal static level. Reduced pressure in cylinder 16 enables the spring 78 to move piston 48 to the right. Pump return spring 78 is selected to have a force greater than the relaxed pulse force (rebound periods) but less than pulse peak force (jounce periods). The described pump action requires only slight suspension movements such as occur during normal operation of the vehicle. Pressurized liquid in accumulator chamber 60 is utilized when or if the suspension should for any reason lower the sprung mass below its normal static position.

As previously indicated, when the sprung mass (hull) is too low relative to the roadwheel pressurized liquid is conveyed from accumulator chamber 60 to cylinder 16, thereby restoring the hull to its proper height. When the hull is too high relative to the roadwheel liquid is vented from cylinder 16 to sump 42, thereby lowering the hull into its proper height range. Directional control of the liquid for producing these operations (raising or lowering the hull) is provided by the aforementioned valve 44.

In the illustrative drawing valve 44 comprises a sleeve 47 integral with stub shaft 12, and a concentric sleeve 49 integral with a cover plate 51 carried by road arm 10. The interior space within sleeve 47 is subdivided into two semi-circular chambers by a partition 55.

Sleeve 47 is provided with a pressurization port 57 and a series of vent ports 61. If and when the hull moves downwardly to the jounce position 14a, port 57 communicates with port 63 in sleeve 49, thereby permitting pressurized liquid to flow from accumulator 60 to cylinder 16. The path for liquid flow comprises check valve 65, tube 67, passage 69 in cover plate 51, the upper semi-circular chamber in sleeve 47, ports 57 and 63, and duct 71. Duct 71 would in practice be a series of drilled passages in plates 51 and the outer wall portion of the road arm. Hydraulic flow through the described path raises the hull until port 57 no longer overlaps port 63, whereupon the flow ceases.

Should the hull move upwardly toward the rebound position 14b the port 63 communicates with one or more vent ports 61, thereby permitting pressurized liquid to vent from cylinder 16 to sump 42. The vent flow path comprises duct 71, ports 63 and 61, the lower semi-circular chamber in sleeve 47, and drain port 45. Hydraulic flow through this path lowers the hull into its normal height range, whereupon port 63 moves out of registry with ports 61 to cut off the flow.

The need for height control usually results from such circumstances as the loading or unloading of cargo, thermal expansion or contraction of the hydraulic fluid, or leakage out of the system. Actually, in the illustrated arrangement leakage out of the system should be minimal because there is only one moving seal between the hydraulic chamber system and atmosphere. The moving seal I have reference to is at the bearing 13 between stub shaft 12 and the inner wall of road arm 10. That seal is required to handle only relatively light sump pressure; hence leakage at that seal should be minimal.

The described pump 38 is operated by comparatively minor oscillatory motions of road arm 10 (less than the movement required for opening valve 44). Pump 38 is operated during normal suspension action, thus providing suitable pressurization of chamber 60 for use when needed.

Certain valves may or may not be needed to protect the components and maintain desired pressure or flow conditions. One way valve 75 is provided to relieve excessive pump 38 output pressure; normally valve 75 would be in a closed condition. One way valve 65 is an anti-surge valve to prevent surges in cylinder 16 from being transmitted to chamber 60 through tube 67. The one way valves at 26 and 36 are conventional valves used to vary the dashpot action during different directions of the roadwheel. Normally valve 26 would be a lower flow rate than valve 36 to provide a relatively slow jounce stroke and a relatively fast rebound stroke.

Figure 2:
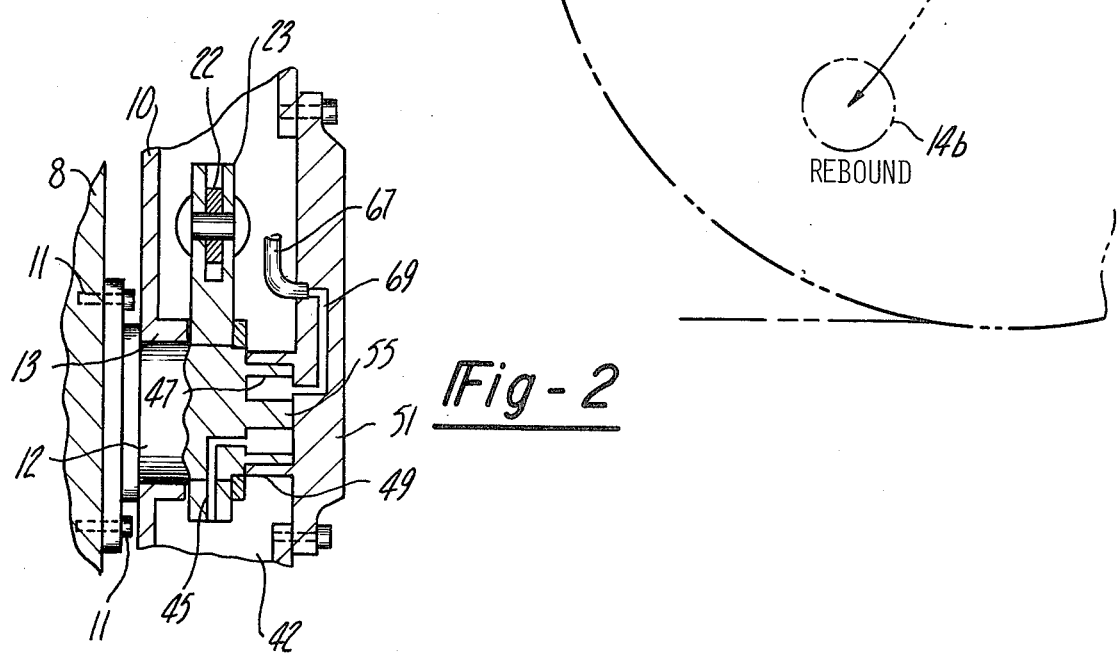
FIG. 2 is a fragmentary sectional view taken on line 2—2 in FIG. 1.
Figure 3:
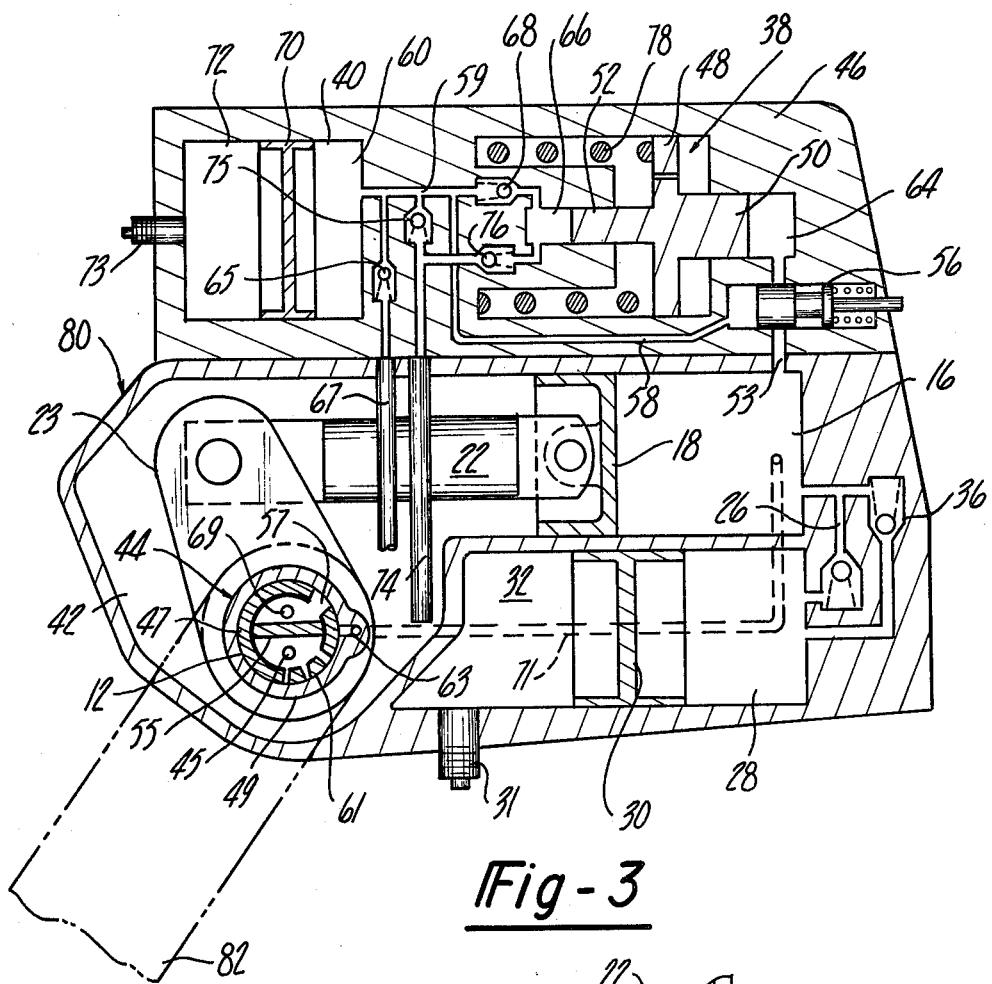
FIGS. 3 and 4 illustrate a second embodiment of the invention.
Figure 4:
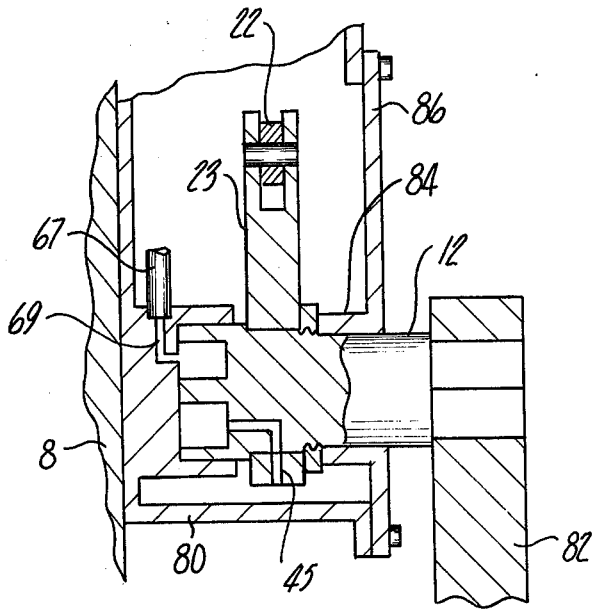

The invention may be practiced in various structural forms. FIGS. 3 and 4 illustrate an arrangement that is similar to FIGS. 1 and 2 in respect to the hydraulic passage system, but differs in that the hydraulic-pneumatic components are carried by the hull 8 rather than the road arm. There is shown a housing 80 bolted or otherwise secured to the sprung mass (hull) and containing the previously described hydraulic-pneumatic components. In this case the road arm 82 is carried on a shaft 12 that is rotatably extended through a bearing 84 carried by cover plate 86 for housing 80.

An upstanding arm 23 is suitably affixed to shaft 12 so that arm 23 moves with the road arm 82. It can be visualized from FIG. 3 that jounce movement of road arm 82 causes arm 23 to move piston rod 22 to the right, thereby driving piston 18 further into dashpot cylinder 16. Rebound movement of road arm 82 produces reverse movement of piston 18. The effect is the same as experienced with the arrangement of FIG. 1 in a suspension aspect. The valving for directional control of the hydraulic fluid is similar to the aforementioned valve 44 used in FIG. 1. Hence detailed operational description is believed unnecessary.

A principle feature of this invention is the self-contained nature of the hydraulic-pneumatic system wherein each road wheel is equipped with its own hydraulic dashpot-liquid circulation system; no hydraulic, pneumatic, or electric lines need be extended to other road wheels or to a central control system. This eliminates much complexity as well as space and weight. Additionally, maintenance and replacement operations are simplified since any single malfunctioning road wheel can be serviced without affecting other road wheels in the system. This is a particular advantage in military tanks which use large numbers of road wheels.

I wish it to be understood that I do not desire to be limited to the exact details of construction shown and described for obvious modifications will occur to a person skilled in the art.

I claim:

1. In a vehicle comprising a sprung mass, a road wheel, a vehicle suspension including a pneumatic chamber means (32) trained between the road wheel and sprung mass to provide a resilient suspension force, and a hydraulic dashpot (16, 18) for controlling expansive-contractive movements of the pneumatic chamber means: the improvement comprising means for maintaining the sprung mass within a predetermined height range relative to the road wheel, said height-maintaining means comprising an auxiliary hydraulic pressure accumulator (40), a sump (42), a hydraulic pump (38) operated by reciprocatory action of the dashpot to maintain the accumulator in a pressurized condition, and a directional valve (42) responsive to vehicle height change for alternately venting liquid from the dashpot to the sump when the sprung mass tends to go above its normal height range and passing pressurized liquid from the accumulator to the dashpot when the sprung mass tends to go below its normal height range; said hydraulic pump (38) comprising a piston (48) having a relatively large diameter actuator section (50) supplied with liquid from the dashpot, and a relatively small diameter pumping section (52) communicating with the auxiliary accumulator.

2. The improvement of claim 1, said pump including an inlet check valve (76) permitting one way flow from the sump to the piston pumping section, and an outlet check valve (68) permitting one way flow from the piston pumping section to the accumulator.

3. The improvement of claim 1, said pump including a spring (78) exerting a return force on the piston in opposition to the liquid supply pressure at the actuator section.

4. The improvement of claim 3, the spring being sized to exert a force on the piston that is less than dashpot liquid force during the jounce period but greater than dashpot liquid force during the rebound period.

5. The improvement of claim 3, the spring being selected so that dashpot liquid moves the piston in the pumping direction during jounce periods and the spring moves the piston in the intake direction during rebound periods.

6. The improvement of claim 1, the pump comprising an actuator section (64) receiving liquid pressure from the dashpot and a pumping section (66) communicating with the accumulator, a normally-open isolation valve (56) interposed between the dashpot and the pump actuator section, and duct means (58) responsive to pressurization of the accumulator for closing the isolation valve.

7. The improvement of claim 1, said directional valve (42) comprising first and second ported elements rotatably connected so that a set of dashpot vent ports is opened as the sprung mass goes above its normal height range, and a set of dashpot pressurizing ports is opened as the sprung mass goes below its normal height range.

8. The improvement of claim 1, ther vehicle suspension comprising a road arm pivotally connected to the sprung mass for arcuate movement around a horizontal pivot axis; the directional valve (42) comprising two concentric sleeves carried respectively by the sprung mass and road arm for relative rotation around said pivot axis; said concentric sleeves defining one set of ports for venting liquid from the dashpot to the sump, and another set of ports for passing liquid from the accumulator to the dashpot.

9. In the improvements of claim 1, the directional valve being operable to automatically isolate the dashpot from the sump and accumulator when the sprung mass is within its normal height range.

* * * * *